RE 25471
Nov. 7, 1961   J. V. FREDD   3,007,669
VALVE
Filed Sept. 13, 1956   6 Sheets-Sheet 1
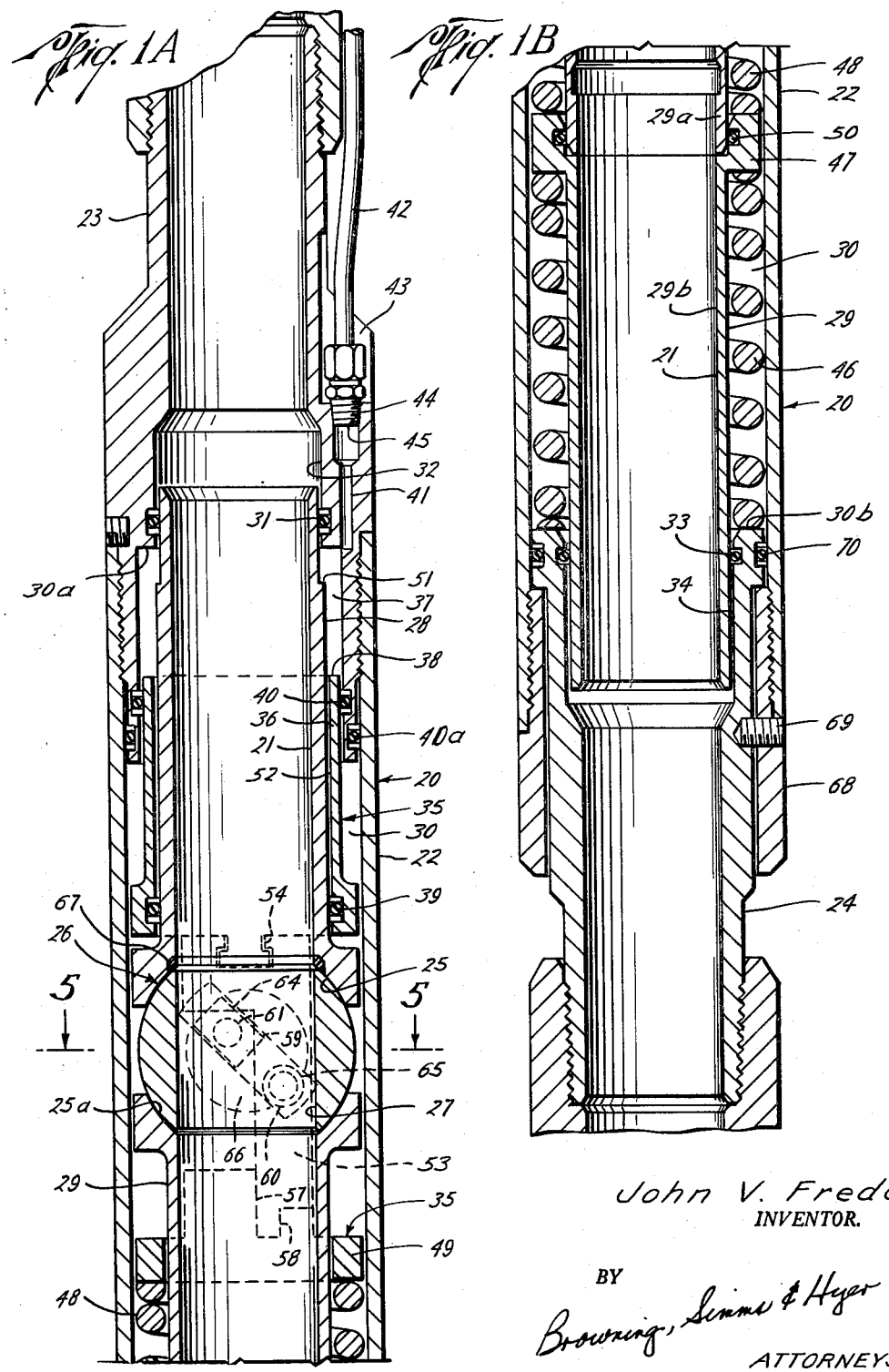
John V. Fredd
INVENTOR.
BY Browning, Simms & Hyer
ATTORNEYS

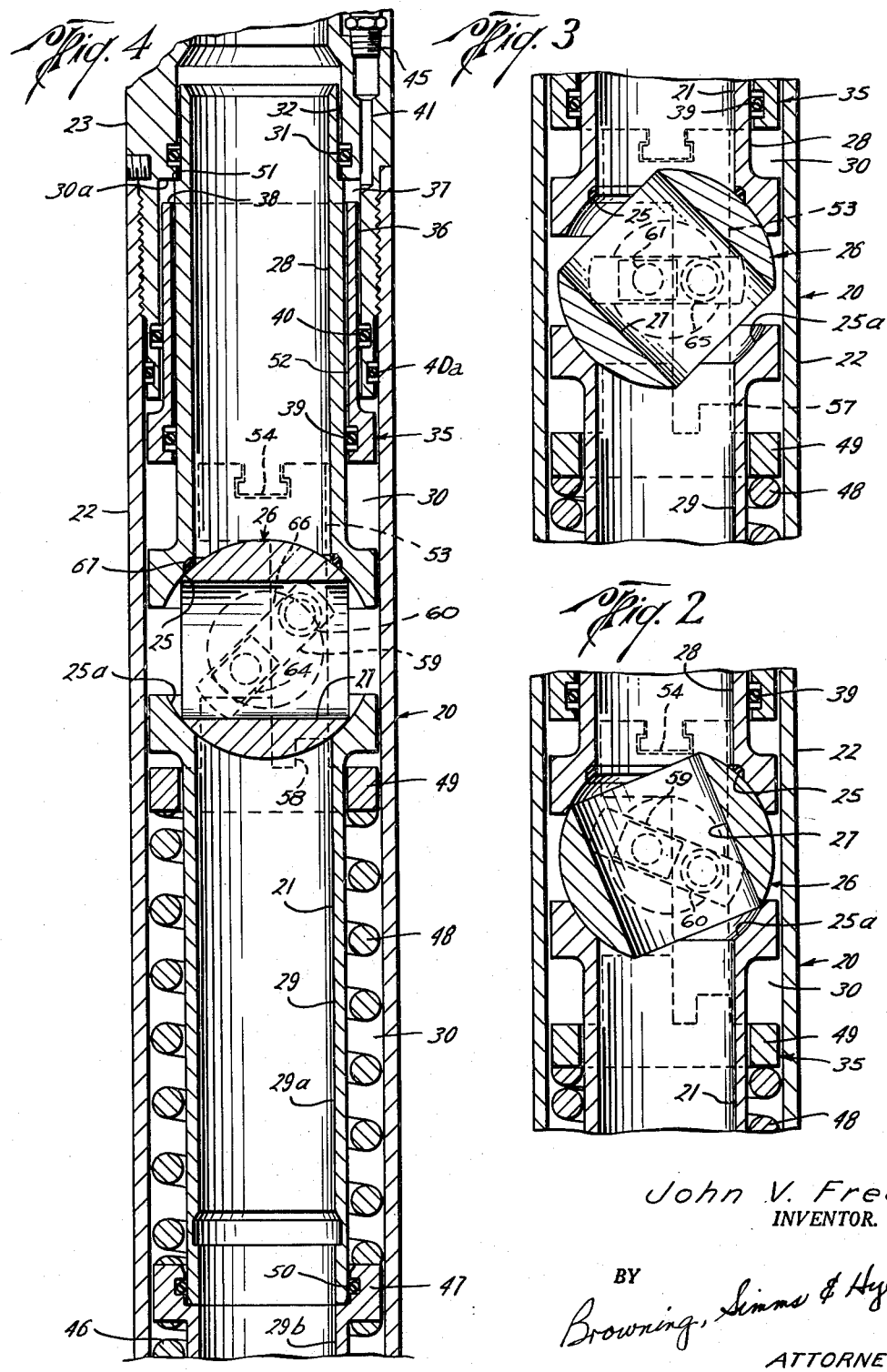

Nov. 7, 1961  J. V. FREDD  3,007,669
VALVE
Filed Sept. 13, 1956  6 Sheets-Sheet 3
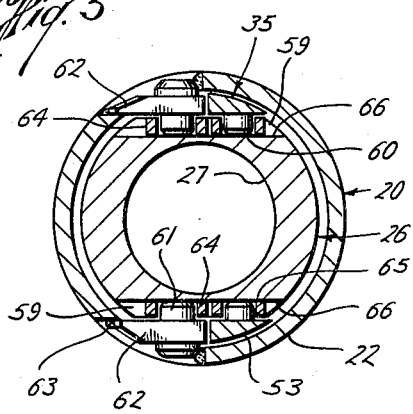
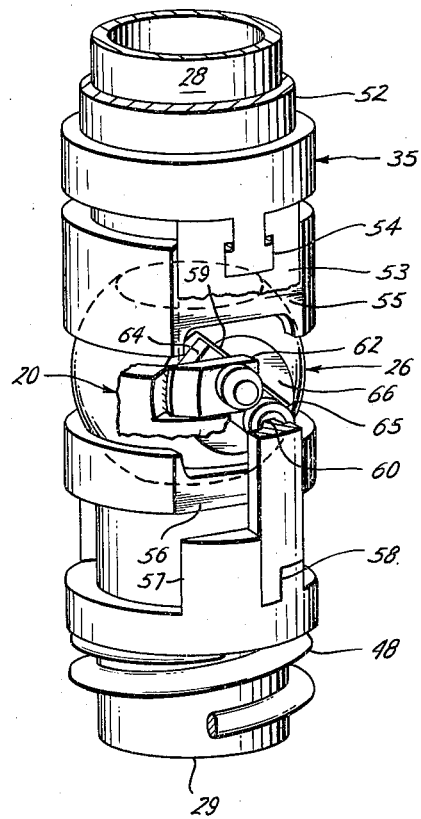
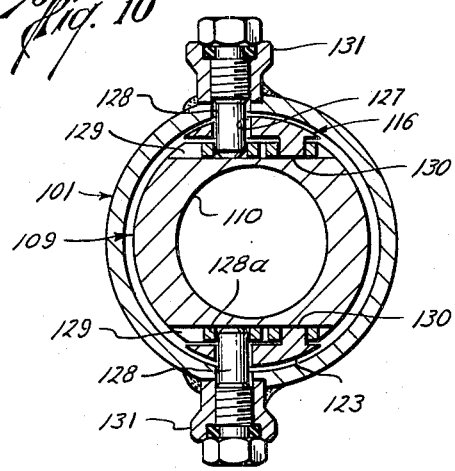
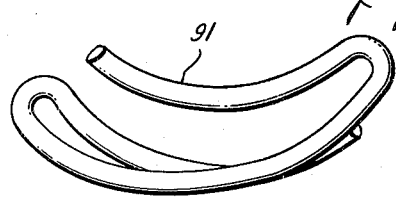
John V. Fredd
INVENTOR.
BY Browning, Simms & Hyer
ATTORNEYS Nov. 7, 1961  J. V. FREDD  3,007,669
VALVE
Filed Sept. 13, 1956  6 Sheets-Sheet 4
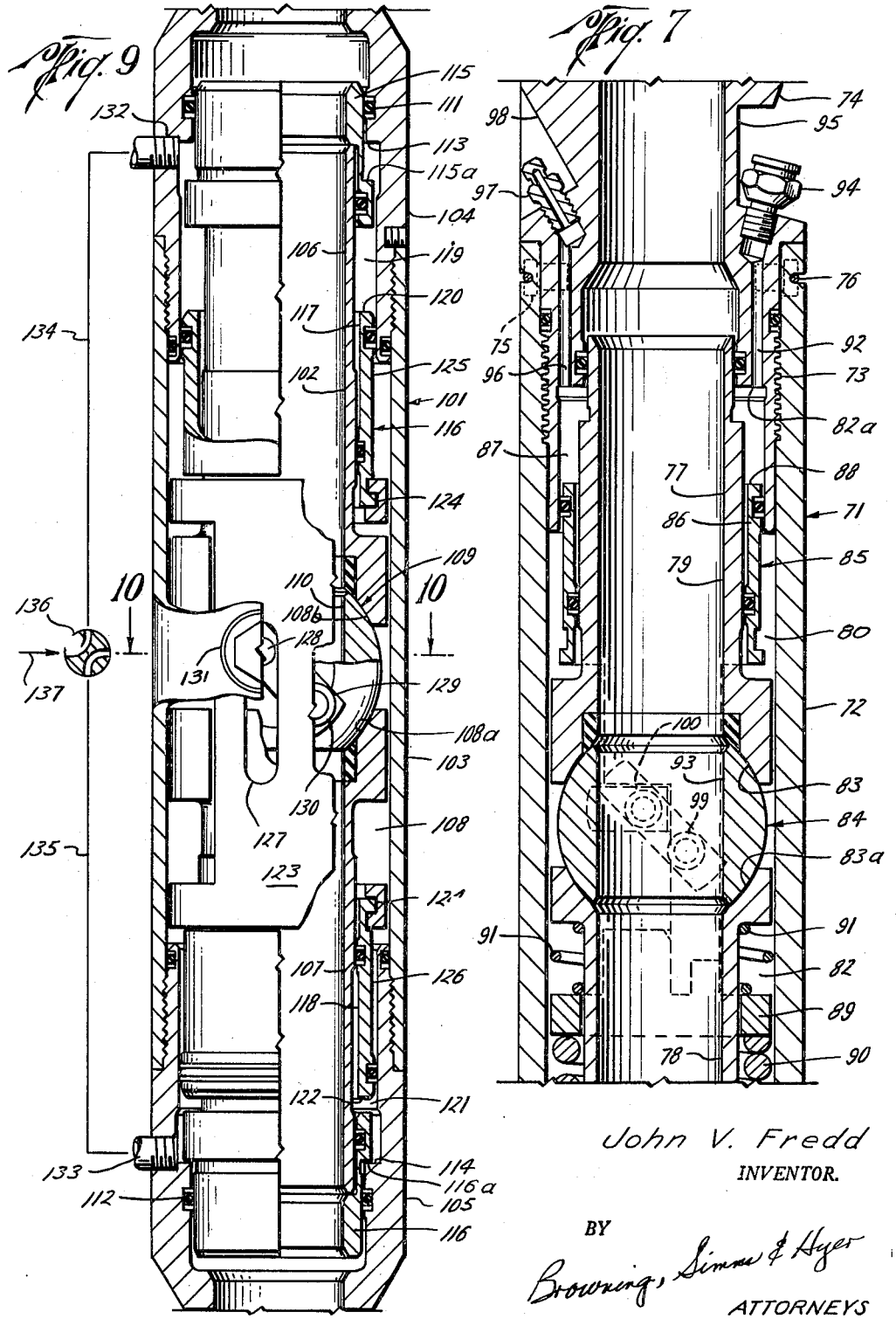
John V. Fredd
INVENTOR.
BY Browning, Simms & Hyer
ATTORNEYS John V. Fredd
INVENTOR.

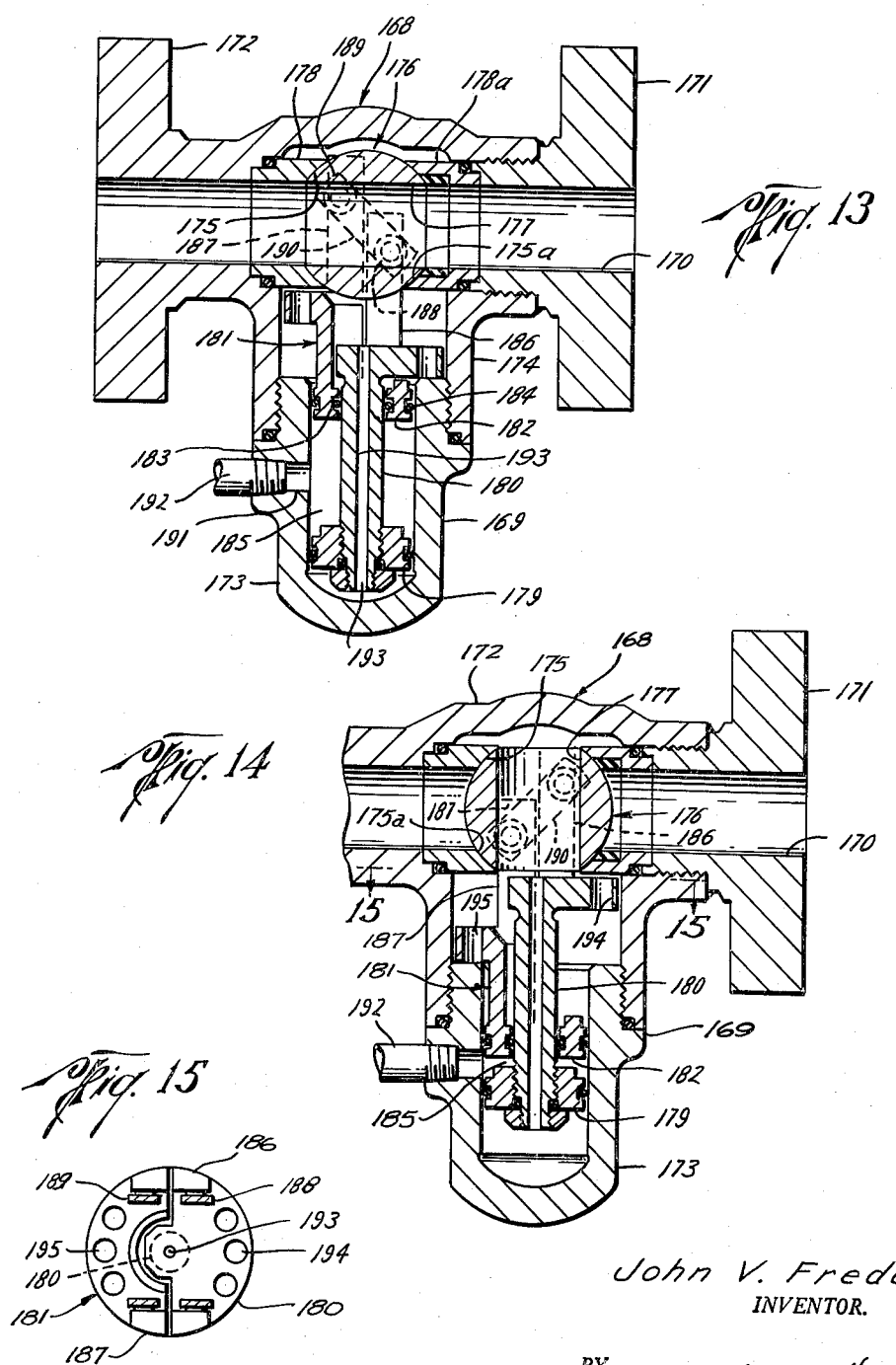

United States Patent Office 3,007,669
Patented Nov. 7, 1961

3,007,669
VALVE
John V. Fredd, Dallas, Tex., assignor to Otis Engineering Corporation, Dallas, Tex., a corporation of Texas
Filed Sept. 13, 1956, Ser. No. 609,584
28 Claims. (Cl. 251—31)

This invention relates to valves of the type having a valve member rotatable between opened and closed positions by means of a control pressure. More particularly, this invention relates to improvements in a valve of the type disclosed and claimed in a copending patent application entitled "Valve" Serial No. 608,081, filed by James H. Bostock on September 5, 1956, now Patent No. 2,894,-715 of July 14, 1959.

The illustrated embodiment of the valve of the aforementioned copending application is especially well suited for use at a subsurface level in that it is controllable from a remote location, such as a source of control fluid at ground level, and further in that the valve member thereof is rotatable to a position providing a straight-through full opening. The fluid pressure-operated actuator for so rotating the valve member is preferably reciprocable longitudinally within the valve body, so as to reduce the cross-section thereof, and is urged in opposite directions by relatively large forces so as to be positive of action in opening or closing the valve under all line pressure conditions. In the preferred form of this valve, the actuator is disposed with a space annularly of the passageway through the valve body and closed against the admission of solids within the line fluid. It is contemplated further that this space will be formed by tubular members axially aligned to define the passageway through the valve and having seats upon opposite sides of the valve member. One of said tubular members is so arranged that its seat exerts a force on the valve member which is considerably less than the force required for moving the actuator, and substantially no greater than that required in excluding solids from the closed space. In this manner, friction on the valve member is reduced to a minimum and it can be turned with relative ease.

An object of the present invention is to provide a valve of the general character above-described in which the valve member is moved between opened and closed positions with greater mechanical advantage.

Another object is to provide a valve of the character described in the foregoing object, in which the actuator for the valve member is urged in a direction opposite that toward which it is urged by control fluid by a force due to either control fluid or line fluid.

Yet another object is to provide a valve of the general character above-described in which both valve seats are maintained in seating engagement with the valve member with a considerably smaller force than is required to move the actuator; and, more particularly, wherein the seats are so maintained during longitudinal as well as rotary movement of the valve member between opened and closed positions.

Still another object is to provide a valve of the character described in the aforementioned copending application in which the valve member thereof has a compound movement between opened and closed positions which assists it in closing.

A further object is to provide a valve of the character outlined in the foregoing object, in which at least one of the seats is urged into seating engagement with the valve member by the same source of control fluid which urges the reciprocable actuator in one direction.

Other objects, advantages and features of this invention will be apparent to one skilled in the art upon a consideration of the written specification, the attached claims and the annexed drawings.

In the drawings, wherein like reference characters are used throughout to designate like parts:

FIGS. 1A and 1B are longitudinal sectional views of the upper and lower portions, respectively, of a subsurface valve constructed in accordance with the present invention, and with the valve member thereof in fully opened position.

FIGS. 2 to 4 are longitudinal sectional views of the middle portion of the valve of FIGS. 1A and 1B, FIG. 4 showing the valve member in closed position and FIGS. 2 and 3 showing such valve member in positions intermediate opened and closed positions.

FIG. 5 is a cross-sectional view of the valve of FIGS. 1A and 1B, taken substantially along broken line 5—5 of FIG. 1A;

FIG. 6 is a partial perspective view of the valve member, seats, and actuator or control frame for moving the valve member of the valve of FIGS. 1 to 5;

FIG. 7 is a longitudinal sectional view of the upper portion of another valve constructed in accordance with this invention;

FIG. 8 is an enlarged detail view of a spring used in connection with the valve of FIG. 7;

FIG. 9 is a longitudinal sectional view of still another valve constructed in accordance with this invention, and in which the control frame thereof is positively urged in both directions by a control fluid;

FIG. 10 is a cross-sectional view of the valve of FIG. 9, taken substantially along broken line 10—10 of FIG. 9;

Figure 11:
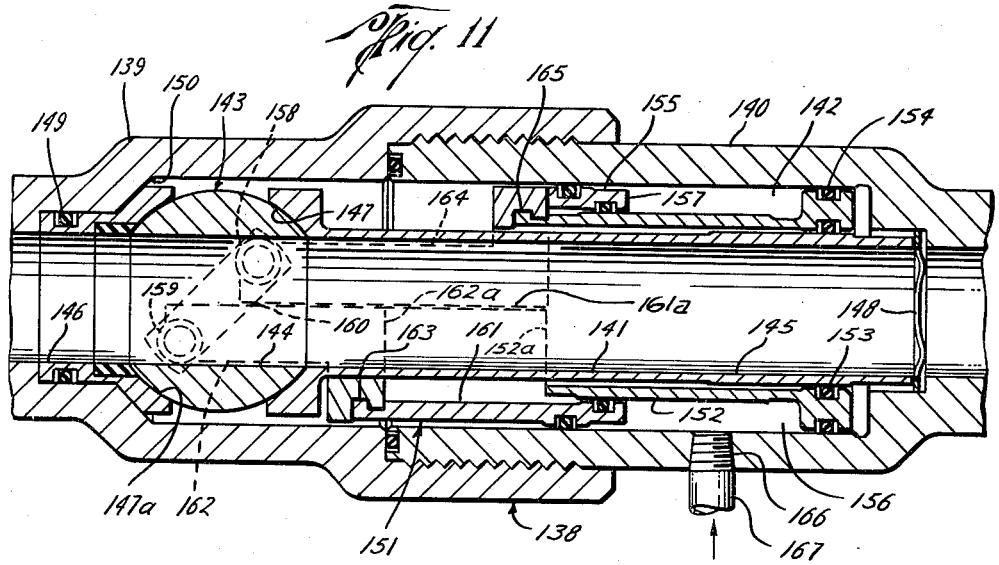
FIGS. 11 and 12 are longitudinal sectional views of a further valve constructed in accordance with this invention in its opened and closed positions, respectively.

FIGS. 13 and 14 are longitudinal sectional views of a still further valve constructed in accordance with this invention, in its opened and closed positions, respectively; and FIG. 15 is a cross-sectional view of the control frame of the valve of FIGS. 13 and 14, removed from the valve body thereof and as seen along broken line 15—15 of FIG. 14.

Referring now in detail to the above-described drawings, the valve illustrated in FIGS. 1A, 1B and 2 to 6 comprises a valve body 20 having a passageway 21 therethrough and connectable at its opposite ends in a flow line. More particularly the valve body 20 will be seen from FIGS. 1A and 1B to comprise a centrally disposed, longitudinally extending sleeve portion 22 threadedly connected at its upper end to sub 23 and connected to sub 24 at its lower end, in a manner to be described hereinafter. As in the case of the aforementioned copending application, the flow line may comprise a production tubing within a well with the valve disposed at a subsurface level therein and having a fluid connection with a source of pressure fluid at ground level for actuating same. Alternatively, the flow line may be a pipe line at a remote location above ground wherein it would be desirable or necessary to control opening and closing of the valve from a more convenient location. It is further contemplated that the diameter of the passageway 21 will correspond at least approximately to the minimum diameter of the flow line so that it will be "full-opening."

Disposed substantially coextensively of the sleeve 22 of the valve body and in surrounding relation to the passageway 21 are a pair of spaced apart and oppositely facing spherical seats 25 and 25a. A ball valve member 26 having an opening 27 therethrough is seatable between the seats 25 and 25a for rotation about an axis transverse to the axis of the opening 27 between opened (FIG. 1A) and closed (FIG. 4) positions. As best shown in FIG. 1A, the diameter of the opening 27 corresponds to that of the passageway 21 so that the valve is straight-through and "full-opening."

As also discussed in the aforementioned copending application, the ball shape of the valve member is preferred due to its greater adaptability to seating as well as the fact that it requires a minimum of space within the valve. However, it is contemplated that the valve member may be cylindrical or even conical, in which case modifications to the illustrated structure would be obvious to one skilled in the art.

The passageway 21 is defined by the inner diameter of first and second tubular members 28 and 29 which are arranged substantially coaxially of one another and concentrically within the sleeve 22 of the valve body to provide an annular space 30 therebetween. More particularly, the seats 25 and 25a are formed on the oppositely facing ends of the tubular members 28 and 29, respectively.

As distinguished from the valve illustrated in the aforementioned copending application, however, both of the tubular members 28 and 29 are guidably movable longitudinally within the valve body in sealed relation thereto so as to close both opposite ends 30a and 30b of the space 30. More particularly, an O-ring 31 or other sealing member is received within an enlarged diameter portion 32 of the sub 23 to form a sliding seal with the upper end of the tubular member 28, and as shown in FIG. 1B, an O-ring 33 is received within an enlarged diameter portion 34 of the lower sub 24 of the valve body for sealing engagement with respect to the lower end of tubular member 29.

The valve member 26 is rotated between closed and fully opened positions by means of a cylindrical actuator or control frame 35 which is longitudinally reciprocable within the enclosed space 30. More particularly, the control frame 35 is provided at its upper end with an annular piston 36 sealably slidable within the space 30 to define a variable capacity pressure chamber 37 between the upper pressure responsive surface 38 of the piston 36 and the closed upper end 30a of the space. Thus, the inner diameter of the control frame 35 carries an O-ring 39 sealably slidable with respect to the outer diameter of tubular member 28, and the inner diameter of a lower portion of sub 23 carries an O-ring 40 for sealing with respect to the outer diameter of the piston 36. This lower portion of the sub 23 carrying the O-ring 40 also carries an O-ring 40a on its outer diameter for sealing with respect to the inner diameter of sleeve portion 22 of the valve body beneath its threaded connection with the sub 23.

A port 41 is provided through the valve body, and more particularly, through the upper sub 23 thereof, for communication with the variable capacity pressure chamber 37. As in the case of the aforementioned copending application, it is contemplated that the control fluid will be hydraulic so that the pressure fluid admitted to the chamber through the port 41 will urge the control frame 35 in a downward direction, while the exhaust of such control fluid, which relieves the pressure on the pressure responsive surface 38 of piston 36, will permit the frame to be moved in an opposite, or upward, direction by means to be described. In the case of subsurface valves, the force for urging the control frame 35 upwardly will be resisted by the weight of the column of hydraulic fluid thereabove.

Control fluid may be supplied from any suitable source, such as a location remote from the valve, and selectively admitted to or exhausted from the pressure chamber 37 by either manual or automatic means. In the latter case, such control may be made responsive to a predetermined condition at the source of the control fluid or another location. Furthermore, in the case of a subsurface valve, the control fluid may be supplied through a small line or conductor 42 connected to the port 41 and extending upwardly to a source of such fluid at ground level, in which case, of course, production flow would be upwardly through the valve. As shown in FIG. 1A, the sub 23 may be recessed at 43 to permit the threaded lower end 44 of the line 42 to be connected to a tapped opening 45 in the sub 23 communicating with port 41.

In this particular embodiment of the invention, the control frame 35 is urged upwardly, or in a direction opposite that toward which it is urged by control fluid within the variable capacity pressure chamber 37, and the seat 25a is urged into seating engagement with the valve member by spring means disposed concentrically outwardly of the passageway 21 therethrough and bearing against the frame and tubular member 29, respectively. This spring means will be so designed as to exert sufficient force on the control frame to positively open or close the valve upon the relief of the pressure of the control fluid within the pressure chamber 37, while at the same time exerting a lesser force on the seat 25a to reduce frictional resistance to turning of the valve member. Thus, as mentioned in connection with the aforementioned copending application, the valve is especially well suited for low pressure installations. Of course, in installations wherein the line fluid is under high pressure, the spring means for urging the frame may be so designed as to exert less force.

In its preferred form, this spring means includes a first coil spring 46 disposed between the closed end 30b of the space 30 which is formed on the inner end of the sub 24 and an annular bearing part 47 on the second tubular member 29, and a second coil spring 48 disposed between the bearing part 47 and a thrust ring 49 on the lower end of the control frame 35. As shown in FIG. 1B, the second tubular member 29 is, for assembly purposes, formed in two parts 29a and 29b which, when assembled, are sealed with respect to one another by means of O-ring 50. The bearing part 47 is disposed on the lower part 29b.

This spring means acts upon the control frame 35 to urge it upwardly with the relatively large force required to insure positive movement of the valve member to one of its positions. On the other hand, the springs 46 and 48 act oppositely to one another with respect to the second tubular member 29 so that, with the force exerted by the spring 48 at least approaching that due to the spring 46, the seat 25a will exert only a light force upon the valve member 26. The upper seat 25 is caused to exert a correspondingly light seating force on the opposite side of the valve member 26 by means of a relatively small annular piston 51 on the outer diameter of tubular member 28, which is urged downwardly by control fluid within the pressure chamber 37. As can be seen from FIGS. 1A and 4, the piston 36 surrounding piston 51 is of considerably larger size so as to urge the control frame 35 in one direction with a considerably larger force.

During most of the opening and closing movements of the valve member, the space 30 will be fully exposed to line fluid within the passageway through the valve, as illustrated in FIG. 3. However, the valve member will be in such intermediate positions during only short and isolated periods of time, and ordinarily it will be in either the open position of FIG. 1A or the closed position of FIG. 4, so as to close off the space 30 against the admission thereto of solids in the line fluid.

It is contemplated that the piston 51 may be so designed and the springs 46 and 48 so arranged and related that the seating force on the valve member is light so as to permit easy turning of the valve member. Thus, when the valve member is in either of said opened or closed positions, there will be leakage across the upstream seat sufficient to permit the space to breathe, but insufficient to permit the admission of solids.

In view of the foregoing, it is obvious that there is pressure equalization between the space and passageway during most of the movement of piston 36, which might otherwise change the pressure of the fluid within the space. The movement of the piston toward the start and finish of the opening and closing movements of the valve member (see FIG. 2) is, of course, small, and has little tendency to change the pressure of the fluid within the space 30. Should large changes in pressure of the line fluid flowing through the open valve be found to cause throttling across the upstream seat, a vent may be provided between the space and passageway, although it is preferred to limit pressure equalization between the space and passageway to the leakage aforementioned.

It will also be noted, as distinguished from the valve of the aforementioned copending application, that both of the springs 46 and 48 are disposed within the space 30 so as to be protected, along with the control frame 35, from solids within the fluid flowing through the valve. Thus, the annular bearing part 47 does not have a sliding seal with respect to the inner diameter of the sleeve portion 22 of the valve body.

In installations in which the fluid flowing through the valve is uncontaminated, the space 30 need not necessarily be closed at its lower end 30b. However, the construction shown in the above-described figures is preferred not only since it provides a positive movement for the valve member under a wide range of pressure conditions, but also because it protects the actuating parts of the valve member from any solids which might be in the fluid flowing through the well and urges the lower seat 25a into seating engagement with the valve member with a relatively light force. Still further, it can be seen from the drawings that each of the springs 46 and 48 is disposed on the side of the valve member 26 opposite from the piston 36 so that an intermediate portion of the control frame 35 (see broken lines of FIGS. 1 to 4) between the piston 36 and the thrust ring 49 may surround the valve member in closely spaced relation thereto.

For assembly purposes, the control frame 35 is made up of a plurality of separate parts which may be assembled into the integral unit shown in the drawings. More particularly, the control frame includes an upper portion 52 having the annular piston 36 at its upper end and carrying the O-ring 39 toward its lower end. This upper portion 52 of the control frame is movable above the valve seat 25 longitudinally within the space 30 and is connected to an intermediate portion 53 of the control frame by means of a T slot connection 54. As best shown in FIG. 6, the enlarged ends of the tubular members 28 and 29 upon which seats 25 and 25a are formed are machined away as at 55 and 56, respectively, so as to permit the intermediate portion 53 of the control frame to be extended along opposite sides of the valve member 26 between said valve member and the sleeve portion 22 of the valve body 20.

The lower end of the intermediate portions 53 of the control frame are keyed as at 58 to a lower portion 57 thereof upon which the thrust ring 49 is disposed. As can be seen from FIGS. 1A, 4 and FIG. 6, the intermediate portion 53 is reduced in width beneath the slotted connection 54 so as to provide longitudinally extending spaces between laterally extending flanges on said intermediate portions and oppositely facing ledges on the lower portion 57, the purpose of which space will be more apparent hereinafter.

The valve member 26 is connected to the above-described control frame 35 for rotation between closed and fully opened positions in response to reciprocation of the control frame longitudinally within the annular space 30. More particularly, in the embodiment illustrated, the valve member is rotated to closed position (FIG. 4) upon the exhaust of control fluid from the chamber 37 to move the frame into its uppermost position, wherein further upward movement is prevented by the engagement of piston 51 with the closed end 30a of space 30. On the other hand, the valve member is rotated to fully opened position (FIG. 1A) upon the admission of such fluid into the chamber 37 to move the frame into its lowermost position, wherein further downward movement is prevented by engagement of the control frame with parts 62 as shown and to be described hereinafter in connection with FIG. 6. Obviously, however, this arrangement could be reversed so that, for example, the valve member would open in response to relieving of the pressure within the chamber 37.

As in the case of the valve of the aforementioned copending application, the connection of the valve member with the control frame comprises interengaging cam lugs on one and cam slots on the other of the control frame and opposite sides of the valve member. However, in accordance with the present invention, an arrangement is provided which exerts a couple on the valve member in moving it between open and closed position. This arrangement includes substantially rectangularly shaped cam slots 59 formed in opposite sides of the valve member extending transversely to the axis of rotation of the valve member, and cam lugs 60 on the control frame and cam lugs 61 fixedly mounted in the valve body 22 operatively engaged within the slot 59. More particularly, the cam slots 59 extend across the axis of rotation of the ball-shaped valve member 26 and each of the cam lugs 60 and 61 is mounted on the control frame 35 and valve body 22, respectively, for engagement with the cam slots upon opposite sides of the axis of rotation of a valve member. Thus, upon reciprocation of the control frame in the manner above-described, the valve member is caused by cam lugs 60 to pivot about an axis defined by the cam lugs 61 mounted in the valve body, with the cam lugs 60 and 61 sliding toward and away from one another within the cam slot 59, in a manner to be described.

It will be understood that this pivoting of the valve member during its rotation about an axis extending transversely to the longitudinal axis of the valve body causes the valve member to have a compound movement between opened and closed position, which consists of a longitudinal as well as a concurrent rotational component. Thus, as the valve member closes—for example, when it approaches the position of FIG. 3—there will be a pressure drop thereacross which tends to move it longitudinally upward. This, of course, supplements the force on the control frame which is urging the valve member in the same direction, so that this longitudinal component of movement of the valve member assists in closing the valve.

It will be appreciated that with the cam lugs 60 and 61 offset on opposite sides of the rotational axis of the valve member 26, said valve member, and thus the seats 25 and 25a will move longitudinally between opened and closed positions a distance less than the longitudinal movement of the control frame. Thus, for example, with the lugs spaced equally on opposite sides of such axis, the longitudinal movement of the valve member will be one-half that of the control frame. In the illustrated embodiment of the valve, the cam lugs 61 are only one-half as far from this axis as are the cam lugs 60, so that the longitudinal movement of the valve member and seats is only one-third that of the control frame. Thus, although there has been a sacrifice of at least 25% in the maximum effective moment arm between the axes of the lugs 60 and 61, this arrangement not only permits shortening of the entire assembly, but also increases the mechanical advantage of the force of the control frame transmitted through the valve member for moving the seats from 2—to—1 to 3—to—1.

Referring now in detail to the construction of this connection, the fixed cam lugs 61 include pivots mounted on inserts 62 welded within openings 63 provided in the valve body 20. These pivots are surrounded by blocks 64 which are rotatable about the pivots and provide large bearing surfaces for engagement with opposite sides of cam slot 59. The pivots making up the cam lugs 60 are fixedly mounted on the slender part of the intermediate portions 53 of the control frame and are surrounded by rotatable rollers 65 which are engageable with opposite sides of the cam slots 59 to facilitate movement of the cam lugs 60 toward and away from the cam lugs 61.

More particularly, the opposite sides of the valve member upon which the slots 59 are provided are flattened as at 66 and the control frame portions 53 are chordal in cross-section so that the connection of the control frame and valve body may be disposed between the valve member and inner diameter of the valve body without substantially increasing the size of the valve body beyond that required to accommodate the ball-shaped valve member.

The inner periphery of the upper seat 25, which in the described environment constitutes the downstream seat, is provided with a hard metal insert 67. It is also contemplated that the spherical surface forming the seat 25 on the lower end of tubular member 28 may be to a slightly larger radius than the outer diameter of the valve member 26 whereby a lubricant may be disposed within the small space so provided outwardly of the inserts 67.

Turning now to a summary of the operation of the above-described valve, and assuming it to be in open position of FIG. 1A, it will be seen that the control frame 35 and thus the cam lugs 60 have been moved to their lowermost position by the force exerted thereon due to control fluid within pressure chamber 37, such force being sufficiently strong to overcome the force due to spring 48. At the same time, each of the seats 25 and 25a are urged into seating engagement with opposite sides of the valve member, the upper seat being urged downwardly due to the force exerted upon the annular piston 51 by control fluid in the chamber 37, and the lower seat 25a being urged upwardly by the force due to spring 46 less that due to spring 48. It will also be noted that in this position, the lower end of the tubular member 29 is freely received within the enlarged diameter portion 34 of the sub 24. Also, of course, the O-rings 31 and 33 carried by the upper and lower ends of the valve body provide a sliding seal with respect to the tubular members 28 and 29 so that the space 30 is sealed against the admission of solids within the fluid flowing through the valve. Each of the separate parts 29a and 29b of the lower tubular member 29 are urged into the telescoping sealed relation shown in FIGS. 1B and 4 by virtue of the above-described force on part 29b. On the other hand, the intermediate portions 53 and lower portion 57 of the control frame 35 are maintained in interfitting relation by means of the oppositely acting forces on the control frame due to control fluid and the spring 48.

Upon the relief of pressure within the chamber 37 by the exhaustion of control fluid therefrom, the control frame is moved upwardly by the force of the spring 48 thereon. This, of course, causes the cam lugs 60 to act upwardly against the cam slots 59 and pivot the ball valve member 26 about an axis defined by rotational axis of the cam lugs 61 fixed to the valve body. During this pivotal movement of the valve member, and consequent rotation thereof toward the closed position of FIG. 4, the cam lugs 60 and 61 are caused to move toward one another to the position indicated in FIG. 3, wherein the valve member has been moved one-half of the way to its closed position. Continued movement of the control frame and cam lugs 60 upwardly causes the cam lugs 60 and 61 to move away from one another until the control frame reaches its uppermost position of FIG. 4 to close the valve member. As previously mentioned, however, the concurrent upward movement of the valve member during its rotation to closed position supplements the force of the control frame and thus assists in closing the valve member.

Of course, while the control fluid within the chamber 37 is being exhausted, there will still be fluid pressure within the chamber 37 for acting upon piston 51 to maintain upper seat 25 in engagement with the valve member. On the other hand, the spring means will continue to maintain lower seat 25a in engagement with the opposite side of the valve member during such upward movement of the control frame. Also, of course, the separate parts of the control frame are maintained in mating relation due to the maintenance of opposing pressures thereon. Thus, during such closing movement of the valve member, the control frame continues to act as an integral unit and the tubular members 28 and 29 are maintained in seating relation with the valve member. Furthermore, the aforementioned sliding seals provided by O-rings 31 and 33 continue to seal off the space 30 at its opposite ends, and the enlarged diameter portion 32 on upper sub 23 accommodates the upper end of tubular member 28. (See FIG. 4.)

The valve member is returned to the open position of FIG. 1 by the admission of control fluid to the chamber 37 so as to force the control frame 35 downwardly against the force of the spring 48. It will be obvious that during such movement, the separate parts of the control frame will be maintained as an integral unit, the seats will remain in seating engagement with the valve member, and the space 30 will remain closed at its opposite ends, as in the case of the movement of the valve member from open to closed position.

This valve is also provided with means, in addition to that above-described, for closing same, which means is particularly well-suited for subsurface valves inasmuch as it closes the valve automatically upon severing of the well tubing thereabove. Thus, for example, should the wellhead equipment be destroyed or damaged in some way, this valve would provide a safety control over the well by shutting off the production therefrom at a subsurface level below the wellhead equipment.

Thus, with reference to FIG. 1B, the lower end of the sleeve portion 22 of the valve body is threadedly connected to a retainer part 68 which supports a shear pin 69 for connection with the sub 24. It will be understood that with the tubing beneath the valve fixedly supported in the well, the weight of tubing severed above the valve would be imposed upon the valve body so as to shear the pin 69 and permit the sleeve portion 22 to move downwardly relative to the sub 24. Obviously, this downward movement of the sleeve portion 22 of the valve body forces cam lugs 61 downwardly against cam slots 59, compresses the spring 46, and rotates the valve member to closed position. As can be seen from FIG. 1B, the upper outer portion of sub 24 is provided with an O-ring 70 to seal with the inner diameter of the lower end of sleeve portion 22 above retainer 68.

The embodiment of the valve illustrated in part in FIG. 7 differs from that previously described in a manner to make it particularly useful in a string of drill pipe at a point either just below or just above the kelly of the rotary table of well drilling equipment. Thus, in the event of a blowout or threatened blowout during the drilling of a well, the operator may readily close the valve in a manner to be described hereinafter.

Thus, in accordance with its preferred environment, the valve body 71 may be connected at its opposite ends in a drill string either just above or just below the kelly. Thus the valve body 71 includes an intermediate sleeve portion 72, the upper end of which is connected by coarse threads 73 to a sub 74, which is in turn connectable in the drill string. More particularly, the threads 73 are prevented from loosening by lock screws 75 which are held against backing out by means of snap rings 76 disposed within a groove circumferentially of the outer diameter of the sleeve 72 and matching grooves within the lock screws. The lower end of the sleeve 72 may be similarly connected to a lower sub (not shown) for connection to the remainder of the drill string which extends downwardly into the well.

Similarly to the valve described in connection with FIGS. 1 to 6, a pair of tubular members 77 and 78 are disposed coaxially of one another for longitudinal movement within the valve body 71, and thus define a passageway 79 therethrough and an annular space 82 between the tubular members and the inner diameter of the sleeve portion 72. As was also the case in the earlier described embodiment, upper and lower seats 83 and 83a are formed on the ends of the tubular members 77 and 78, respectively, for seating engagement with opposite sides of a ball-type valve member 84. Additionally, the space 82 is closed at its opposite ends and a control frame 85 is reciprocal within the space and connected with the valve member 84 for rotating it between opened (as shown in FIG. 7) and closed positions.

Thus, the upper end of the control frame 85 is provided with an annular piston 86 sealably slidable within the space 82 to define a variable capacity pressure chamber 87 between the upper closed end 82a of the space and the upper pressure responsive surface 88 of the piston 86.

As in the case of the earlier described valve, the control frame 85 is urged upwardly, or in a direction opposite that toward which it is urged by control fluid within the chamber 87, and the lower seat 83a is urged into seated engagement with the valve member 84 by spring means disposed within the space 82 and bearing upon a thrust ring 89 on the lower end of the frame and a bearing part on the tubular member 78. Furthermore, such spring means is so arranged as to exert a relatively large force on the control frame, but only a relatively light force on the valve seat. As distinguished from the earlier described valve, however, the spring means of the valve of FIG. 7 is arranged in a manner to permit the overall length of the valve to be reduced.

Thus, there is provided a coil spring 90 supported at its lower end on the lower closed end (not shown) of the space 82 and bearing its upper end on thrust ring 89, and a pair of S-shaped springs (see detail of FIG. 8) supported on the upper side of thrust ring 89 and bearing against the underside of the enlarged end of tubular member 78 upon which seat 83a is formed. While the S springs 91 are of such construction as to exert only a relatively light force on the seat 83a, the spring 90 is adapted to exert an effective force on the lower end of the control frame of sufficient magnitude to positively move the valve member to closed position upon the relief of pressure within chamber 87. This effective force is, of course, equal to the upward force due to the spring 90 less the opposing force due to the springs 91.

Control fluid is admitted to the variable capacity pressure chamber 87 through a port 92 formed in the upper sub 74 so as to maintain the valve in the open position of FIG. 7. In such position, the opening 93 through the valve member is aligned with the passageway 79 through the valve body as well as the inner diameter of the flow line, so as to provide a straight-through full opening. Control fluid is forced into the admitting port 92 through a grease or other check valve fitting 94 disposed within a recessed portion 95 of the sub 74. On the other hand, such fluid may be exhausted from the chamber 87 through a port 96 connecting at another location with the chamber 87 and communicating with a frangible closure 97 disposed in another recessed portion 98 of the sub 74.

Thus, control fluid, which preferably is a fluid grease, oil or water, may be forced through the fitting 94 to move the control frame 85 downwardly and rotate the valve member 84 to its open position. Obviously, the fitting 94 retains the control fluid until such time as it is exhausted through port 96. Thus, the valve is closed by breaking the frangible closure 97 to release the control fluid contained within the chamber 87. That is, as in the case of the previously described embodiment of the valve, the relatively strong force due to the spring means overcomes the opposing force upon the control frame due to the relieved pressure within the chamber 87. In actual practice, when the valve is used in a drill string, as previously mentioned, the frangible plug may be broken by a hammer blow after either raising or lowering the string, depending upon whether the valve is disposed above or below the kelly.

It will also be noted that the cam lugs 99 and 100 on the control frame 85 and valve body 71, respectively, are disposed closer together than are the cam lugs 60 and 61 of the valve of FIGS. 1 to 6. In this manner, the longitudinal travel of the valve member 84 between opened and closed positions is shortened. Thus, the length of the entire assembly also may be shortened.

The other features of the valve shown in FIG. 7, and particularly the construction of the control frame 85, are substantially similar to those described in connection with the embodiment of FIGS. 1 to 6, so that they need not be repeated herein.

The embodiment of the valve shown in FIGS. 9 and 10 differs from those previously described in that the control frame therefor is urged positively in both directions by means of a control fluid. Although a valve of this type may be used in substantially the same environments as the valves previously described, it is contemplated that it will be used at surface level and in connection with a hydraulic system which permits the valve to be moved between opened and closed position by means of the same source of control fluid.

Referring now more particularly to FIG. 9, a valve body 101 is connectable at opposite ends in a flow line and provided with a passageway 102 therethrough, which preferably is full-opening in that it corresponds to the minimum inner diameter of the flow line. More particularly, the valve body 101 is made up of an intermediate sleeve portion 103 threadedly and sealably connected at its opposite ends to upper and lower subs 104 and 105, respectively. The passageway 102 through the valve body is defined by a pair of coaxially disposed and longitudinally movable tubular members 106 and 107 arranged concentrically within the valve body so as to provide an annular space 108 therebetween.

Each of the tubular members 106 and 107 are formed with seats 108b and 108a, respectively, on their inner ends for seating engagement with valve member 109. As in the case of the earlier described valves, the valve member 109 is provided with an opening 110 therethrough of a size to provide a full-opening through the valve, and is rotatable about an axis disposed transversely of such opening for movement between such fully opened (FIG. 9) and closed positions. The subs 104 and 105 are provided with O-rings 111 and 112, respectively, along their inner diameters to provide a sliding seal with the outer ends of tubular members 106 and 107. Thus, the upper and lower ends 113 and 114, respectively, of the space 108 are closed so that, as in the case of the earlier described valves, solids within the fluid flowing through the valve are prevented from passage into the space 108. As shown in FIG. 9, the O-rings 111 and 112 are sealably slidable with respect to extensions 115 and 116 of the tubular members.

A control frame 116 is reciprocable longitudinally within the space 108, and thus protected from solids within the line fluid. As distinguished from the earlier described embodiments of this invention, the control frame 116 is provided with annular pistons 117 and 118 on both the upper and lower ends thereof which are sealably slidable within the space 108 to define a variable capacity pressure chamber 119 between the upper closed end 113 of the space 108 and the upper pressure responsive surface 120 of the annular piston 117, as well as another variable capacity pressure chamber 121 intermediate the lower closed end 114 of the space 108 and the lower pressure responsive surface 122 of the annular piston 118.

In this embodiment of the invention, the control frame 116 includes an intermediate portion 123 which, for assembly purposes, is made up of longitudinally separated halves held in place by the sleeve portion 103. These halves are connected at their opposite ends to an upper portion 125 having the piston 117 thereon and a lower portion 126 having the piston 118 thereon. As in the case of the earlier described embodiments of the invention, the enlarged portions on the inner ends of the tubular members 106 and 107 for forming the valve seats 108 and 108a are interrupted at opposite sides so as to receive the longitudinally extending parts of the intermediate portion 123 of the control frame. As shown in FIGS. 9 and 10, this intermediate portion is provided with slots 127 on its opposite sides to permit the passage therethrough of cam lugs 128 fixedly mounted on the valve body 101 and operatively engaged with cam slots 129 on opposite sides of the ball valve member 109.

The cam lugs 128 include pivots having parts 128a rotatable thereabout for bearing against opposite sides of the cam slots 129. Cam lugs 130 are mounted on the longitudinally extending parts of the portion 123 of the control frame for operative engagement with the cam slots 129 on a side of the axis of rotation of the ball valve member opposite to the cam lugs 128. Preferably, the cam lugs mounted on the valve body and the control frame are spaced on opposite sides of this axis of rotation in a manner previously described in connection with the embodiment of FIGS. 1 to 6.

As best shown in FIG. 10, each of the pivots for cam lugs 128 is threadedly received within a cylindrical mounting 131 welded to the outside of the valve body 101. The slots 127 permit the control frame to be moved relatively to the valve body and cam lugs 128.

Each of the upper and lower subs 104 and 105, respectively, are provided with ports 132 and 133 which connect with the variable capacity pressure chambers 119 and 121, respectively. In this manner, a control fluid may be admitted to one chamber and simultaneously exhausted from the other for the purpose of moving the valve member in one direction. For example, with the valve member disposed in the open position of FIG. 9, control fluid may be admitted to the pressure chamber 121 through the port 133 and exhausted from the chamber 119 through the port 132. This, of course, also moves the control frame 116 and cam lugs 130 upwardly so as to swing the valve member 109 about the rotational axis of the cam lugs 128 fixed to the valve body. As a result, the valve member is moved both rotatably and longitudinally upwardly to its closed position. On the other hand, the valve member may be returned to its open position by the readmission of pressure fluid into the chamber 119, together with the simultaneous exhaust of control fluid from the pressure chamber 121.

Furthermore, control lines 134 and 135 may connect the ports 132 and 133, respectively, with a four-way valve, illustrated diagrammatically at 136 in FIG. 9, so that the same source of control fluid may be used for urging the control frame in each opposite direction. That is, as shown in FIG. 9, with the valve 136 in the position shown, control fluid may be supplied through a line 137 for admission to the chamber 119 through port 132. Simultaneously therewith, control fluid from the chamber 121 may be exhausted through the port 133 and the four-way valve 136 for return to said source of control fluid. Alternatively, of course, the fluid admitted and exhausted with respect to each of the chambers 119 and 121 may be from different sources.

It is contemplated that the control fluid for the valve of FIGS. 9 and 10 will be at a pressure less than line pressure. For this purpose, the tubular member extensions 115 and 116 have pressure responsive areas exposed to line fluid which provide annular pistons for maintaining the seats 108b and 108a in seating engagement with the valve member 109 with a relatively light force. Thus, assuming flow through the valve to be downwardly, the admission of control fluid to chamber 119 and its exhaust from chamber 121 will cause downward movement of both the control frame and tubular member 106, thereby maintaining seat 108b against the valve member. On the other hand, although the tubular member 107 is urged upwardly by line pressure acting upon the pressure responsive area on the extension thereof, this tubular member, and thus the seat 108a, are moved downwardly by the bearing of the ball-type valve member thereagainst. Over-travel in a downward direction is prevented by the abutment of a downwardly facing annular shoulder 116a on the extension 116 with the upwardly facing shoulder provided by the enlarged diameter portion of the sub 105 within which the extension 116 is slidable.

It may be that in the above-described case, in which the valve member is moved from closed to open position, downstream line pressure (i.e., the pressure within the line below the closed valve member) is not greater than the control pressure. In such a case the downstream seat 108a may not be maintained in seating engagement with the ball-type valve member until the downstream line pressure approaches that of upstream line pressure.

It is further obvious that the valve may be returned to its closed position by a reversal of the above-described process—i.e., by admitting control pressure to the chamber 121 while relieving it from the pressure 119. During this movement of the valve member from opened to closed position, the line pressure will be the same on both sides of the valve member during most of the closing movement thereof so that both seats will be maintained in seating engagement with the valve member. Also, of course, overtravel in an upward direction is prevented by the abutment of an upwardly facing annular shoulder 115a on the extension 115 for tubular member 106 with the downwardly facing shoulder provided by the enlarged diameter portion within upper sub 104.

The embodiments of the invention should in FIGS. 11 and 12 and FIGS. 13 to 15 differ from the embodiments previously described in that the control frame thereof is moved in one direction by line fluid. Also, although the ball-type valve member is rotatable by means of a couple exerted by spaced apart cam lugs operatively engageable in slots within the valve member, as in the case of the embodiments of FIGS. 1 to 10, each set of the cam lugs is movable with respect to the valve body, and in directions opposite to one another. Furthermore, both sets of cam lugs are spaced equally on opposite sides of the axis of rotation of the valve member so that it is rotated between opened and closed positions without a simultaneous longitudinal movement.

Figure 12:
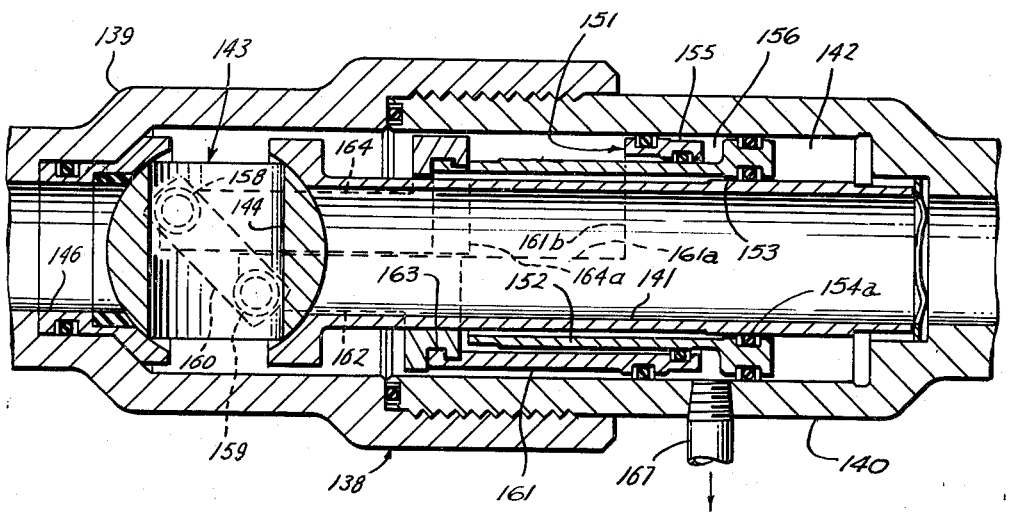

With reference first to the valve shown in FIGS. 11 and 12, a valve body 138 connectable at opposite ends within a flow line is made up of a first female member 139 which threadedly receives a male member 140. A passageway 141 through the valve body s provided by tubular means arranged concentrically within the valve member so as to define an annular space 142 therebetween. More particularly, the tubular means is provided with seat means thereacross for seating upon opposite sides of a ball-type valve member 143 having an opening 144 therethrough, and rotatable about an axis transverse to the opening between a fully opened position (FIG. 11) and a closed position (FIG. 12). More particularly, the opening 144 is of substantially the same size as the valve body passageway 141, and each is in turn of a diameter corresponding to the minimum internal diameter of the flow line in which the valve is connected so that the valve is "full-opening."

The above-menioned tubular means comprises first and second tubular members 145 and 146, arranged coaxially of one another and having valve seats 147 and 147a formed thereon for seating upon opposite sides of valve member 143. More particularly, the tubular members 145 and 146 are fixed against substantial movement longitudinally thereof, although a light spring 148 or the like may be disposed between the outer end of tubular member 145 and an internal shoulder on male member 140 of the valve body so as to permit some yielding of the seats during rotation of the valve member. The tubular member 146 is received within an enlarged diameter portion of the female member 139 of the valve body and provided with an O-ring 149 for sealing with respect thereto. This arrangement enables one end 150 of the space 142 to be closed so that, with the seats 147 and 147a seatable upon the ball-type valve member in a manner to prevent the admission of solids within the line fluid into the space 142, and further with the opposite end of the space 142 closed in a manner to be described hereinafter, a control frame 151 reciprocable longitudinally within this space is protected against such solids.

A tubular part 152 is disposed within the space 142 for movement longitudinally of the valve body and telescopically of the control frame 151. More particularly, the tubular part 152 is provided with a piston 153 at one end having O-rings 154 and 154a thereon sealably slidable within the space to close the end thereof opposite the closed end 150. The control frame 151 is, in turn, provided with an annular piston 155 sealably slidable within the space 142 between the inner diameter of the valve body 138 and the outer diameter of the tubular part 152. Thus, there is formed a variable capacity pressure chamber 156 between the closed end of the space 142 provided by piston 153 and the pressure responsive surface 157 on the end of the annular piston 155.

As previously mentioned, both the cam lugs 158 and 159 which are operatively engaged with the cam slots 160 on opposite sides of the valve member 143 are movable with respect to the valve body 138 and in opposite directions with respect to one another. Thus, the control frame 151 comprises a first portion 161 having the annular piston 155 thereon and a second portion 162 connected at 163 to the first part for movement therewith and mounting the cam lugs 159 for bearing against the cam slots 160.

The other cam lugs 158 are mounted upon a portion 164 of the tubular part 152 which is connected as at 165 to the remaining portion of said part having the piston 153 thereon. As indicated by the broken lines in FIGS. 11 and 12, portion 161 of the frame is machined away at 161a to receive portion 164 of part 152 upon movement of the valve toward the open position of FIG. 11. Portions 162 and 164 are also slender of construction and spaced slightly apart along opposite edges so as to permit relative longitudinal movement therebetween. More particularly, as in the case of the previously described embodiments, the enlarged portion on the tubular members 145 and 146 is provided with flats (in a manner not shown) so as to accommodate the slender cam lug mounting portions 162 and 164.

The cam lugs 158 and 159 are operatively engaged with the cam slots 160 at locations substantially equally spaced from opposite sides of the axis of rotation of the ball-type valve member 143 so that the valve member merely rotates between opened and closed positions upon movement of the two cam lug mounting portions in opposite directions. This latter movement is imparted to the cam lug mounting portions by the admission and exhaustion of a control fluid with respect to the variable capacity pressure chamber 156. Thus, the valve body 138 is provided with a port 166 to which a line 167 may be threadedly connected for either admitting or exhausting a suitable control fluid with respect to the chamber 156.

It will be understood from the drawings that the pressure responsive surface of piston 153 opposite that within the chamber 156 communicates with line fluid through the annular space about tubular member 145. It is equally clear that there will be breathing across the upstream seat so that the pressure responsive surface of piston 155 opposite the surface 157 will also be in communication with the line fluid. Thus, when control fluid is admitted to the chamber 156 at a pressure in excess of that of the line fluid, the pistons 153 and 155 will be moved away from one another so as to move the valve member to the open position of FIG. 11. The relief of such control pressure below that of line fluid will permit the pistons 153 and 155 to be moved toward one another to the position of FIG. 12 for closing the valve.

As can be seen from FIG. 11, overtravel of the control frame 151 and tubular part 152 telescopically away from one another is prevented by the engagement of the end 164a of the portion 164 of the part 152 with an oppositely facing surface 161b on the portion 161 of the frame. In the opposite extreme position, as shown in FIG. 12, overtravel is prevented by the engagement of the end 162a of the portion 162 of the control frame 151 with an oppositely facing surface 152a on the portion of the tubular part 152 having the piston 153 thereon.

The embodiment of the valve shown in FIGS. 13 to 15 differs from that shown in FIGS. 11 and 12 principally in that the valve body 168 thereof is provided with a laterally extending portion 169 which provides a space within the valve body outwardly of the passageway 170 therethrough within which the control frame moves in a direction transversely to the valve body. Thus, as shown in FIGS. 13 and 14, the valve body 168 is made up of male and female parts 171 and 172 connectable in a flow line and another part 173 threadedly connected within a boss 174 laterally outwardly of the part 172, said boss and part 173 thus defining the portion 169.

Disposed across the body 168 intermediate the opposite ends thereof and in surrounding relation to the passageway 170 are a pair of spaced apart and oppositely facing valves seats 175 and 175a for seating engagement with opposite sides of the ball-type valve member 176. As in the case of the earlier described embodiments of this invention, the ball-type valve member 176 is provided with an opening 177 therethrough of a diameter corresponding to the passageway 170, and is rotatable about an axis transverse to the opening between a fully opened position (FIG. 13) and a closed position (FIG. 14). More particularly, the seats 175 and 175a may be formed on tubular inserts 178 and 178a, respectively, sealably disposed within the valve body 168 coaxially of one another to define the passageway 170 therethrough.

As can be seen from FIGS. 13 and 14, the space within laterally extending portion 169 of the valve body communicates with the passageway 170 intermediate the spaced apart seats 175 and 175a, so that with breathing across seats 175 and 175a, the space is in communication with line fluid. This space is closed at one end by a piston 179 disposed thereacross and carried upon a part 180 longitudinally reciprocable within the space laterally of the valve body passageway 170. A control frame 181 is also reciprocable longitudinally within the laterally extending space in the valve body, and is provided with a piston 182 telescopically movable over the part 180. More particularly, the piston 182 is provided with an O-ring 183 about its inner diameter for sealably sliding over the part 180 and an O-ring 184 on the outer diameter thereof for sealably sliding within the valve body part 173, so that there is formed between the piston 182 and piston 179 a variable capacity pressure chamber 185.

Each of the part 180 and control frame 181 are provided with portions 186 and 187, respectively, for mounting cam lugs 188 and 189, respectively, for operative engagement within cam slots 190 on opposite sides of the valve member 176 and spaced equal amounts on opposite sides of the axis of rotation of the valve member. More particularly, and as described in connection with the earlier embodiments of this invention, the opposite sides of the ball valve member are flattened so as to accommodate the portions 186 and 187 without substantially enlarging the size of the valve body. Also, as can be seen from FIGS. 13 and 14, the portions 186 and 187 which mount the cam lugs are movable laterally of the valve body passageway 170 in opposite directions with respect to one another intermediate the valve seats 175 and 175a.

Thus, upon expansion of the variable capacity pressure chamber 185 the pistons 179 and 182 are moved away from one another so as to move the valve member to the open position of FIG. 13 by raising the cam lugs 189 and lowering the cam lugs 188. On the other hand, contraction of the chamber 185 raises the cam lugs 188 and lowers the cam lugs 189 to rotate the valve member to the closed position of FIG. 14.

A port 191 is formed in the laterally extending part 173 of the valve body and a line 192 connects such port with a source of control fluid. The tubular part 180 which mounts the piston 179 is provided with a passageway 193 extending longitudinally therethrough and connecting the laterally extending space on the upper side of piston 182 of the control frame with the space beneath piston 179. Thus, the pressure responsive sides of the pistons 182 and 179 opposite to those within the pressure chamber 185 are exposed to pressure within the line, so that the valve is opened upon the admission to chamber 185 of control fluid at a pressure above that in the line. Alternatively, the pressure of control fluid within the chamber may be relived to permit the pistons 179 and 182 to be moved telescopically toward one another by the force of line fluid and thus rotate the valve member to its closed position. Each of the tubular part 180 and control frame 181 may be provided with ports 194 and 195, respectively, which permit free access of the line fluid to the upper side of piston 182 on the control frame.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A valve, comprising a valve body having a passageway therethrough, a pair of spaced apart and oppositely facing valve seats in surrounding relation to an intermediate portion of said passageway, a valve member having an opening therethrough and seatable between said seats for opening and closing said passageway upon rotation about an axis transverse to the opening therethrough, cam slots extending across opposite sides of the valve member substantially perpendicularly to the axis of rotation thereof, means providing a space within the valve body outwardly of the passageway therethrough, means including a control frame guidably movable within the valve body and having a piston thereon adapted to define a variable capacity pressure chamber within the space, means for moving said control frame in opposite longitudinal directions within the valve body to rotate said valve member between opened and closed positions, said last-mentioned means including a port through the valve body communicating with the pressure chamber, and means for urging said control frame in a direction opposite to that toward which it is urged by fluid within said chamber, cam lugs on said control frame operatively engaged with said cam slots, and additional cam lugs operatively engaged with said cam slots and mounted against movement with the control frame so the cam slots pivot thereabout upon said longitudinal movement of the control frame.

2. A valve of the character defined in claim 1, wherein said cam slots are disposed across the axis of rotation of the valve member, and each of the cam lugs on the control frame and additional cam lugs are operatively engaged with said cam slots on opposite sides of said axis of rotation.

3. A valve of the character defined in claim 1, wherein said valve body includes a pressure responsive surface within said chamber opposite to the pressure responsive surface of the piston therein, and said additional cam lugs are mounted on the valve body.

4. A valve of the character defined in claim 1, including a part sealably guidable within said space relatively to the control frame and having a pressure responsive surface within said chamber opposite to the pressure responsive surface of the piston therein, said additional cam lugs being mounted on said part.

5. A valve, comprising a valve body connectable in a flow line and having a passageway therethrough, a pair of oppositely facing longitudinally slidable and spaced apart seats in surrounding relation to an intermediate portion of said passageway, a valve member having an opening therethrough and seatable between said seats for opening and closing said passageway upon the rotation about an axis transverse to the opening therethrough, a control frame movable in a path longitudinally within said valve body concentrically outwardly of the passageway therethrough, means connecting said valve member to said control frame for rotation between opened and closed positions upon movement of the control frame in opposite longitudinal directions, said connecting means comprising cam slots on opposite sides of the valve member, and cam lugs on said control frame and said valve body operatively engaged with said cam slots for imparting longitudinal movement to the valve member concurrently with its rotational movement, means for urging said control frame in said opposite directions, and means for maintaining said seats in seating engagement with said valve member with a lesser force than is exerted upon said control frame by said urging means.

6. A valve comprising a valve body connectable in a flow line, tubular means having a passageway therethrough and sealably slidable longitudinally within the valve body, seat means across said tubular means, a valve member having an opening therethrough of a diameter substantially equal to the diameter of said passageway and seatable on the seat means for opening and closing the passageway upon rotation about an axis disposed transversely to the opening therethrough, means for urging said tubular means into seated engagement with said valve member, means for rotating said valve member between opened and closed positions while concurrently moving it longitudinally of the valve body, said last named means including a control frame movable in a path longitudinally within the valve body concentrically outwardly of the passageway, means for moving said control frame in opposite directions longitudinally within the valve body, and means connecting said valve member to said control frame and said valve body.

7. A valve of the character defined in claim 6, wherein said connecting means comprises cam slots on opposite sides of said valve member, and cam lugs on said valve body and said control frame operatively engaged with said cam slots, said cam lugs on the control frame being engaged with said cam slots at locations laterally offset from the axis of rotation of the valve member.

8. A valve, comprising a valve body connectable in a flow line, tubular means having a passageway therethrough and sealably slidable longitudinally within and concentrically of the valve body to provide an annular space therebetween which is closed at both ends, seat means across an intermediate portion of said tubular means, a valve member having an opening therethrough of a diameter substantially equal to the diameter of said passageway and seatable on the seat means for opening and closing the passageway upon rotation about an axis disposed transversely to the opening therethrough, means urging said tubular means into seated engagement with said valve member, a control frame movable within said space longitudinally of the valve body, means for moving said control frame in opposite directions longitudinally of the valve body, and means connecting said valve member to said valve body and said control frame and responsive to movement of the control frame in opposite longitudinal directions for concurrently rotating and moving said valve member longitudinally of the valve body between opened and closed positions.

9. A valve of the character defined in claim 8, wherein said moving means includes an annular piston on the control frame sealably slidable within said space to provide a variable capacity pressure chamber between one closed end of the space and said piston, a port through the valve member communicating with said chamber, and means for urging said control frame in a direction opposite to that toward which it is urged by fluid within the chamber.

10. A valve of the character defined in claim 9, wherein said control frame urging means comprises a spring disposed longitudinally within said space and bearing against said control frame.

11. A valve of the character defined in claim 10, including another spring disposed longitudinally within said space and bearing against said tubular means, and an annular piston on the tubular means and arranged within said chamber to urge the tubular means in a direction opposite to that in which it is urged by the springs bearing thereagainst, said springs being so related and arranged and said pistons on the tubular means and control frame being so related as to exert a considerably smaller force on the valve member than is exerted upon the control frame.

12. A valve of the character defined in claim 9, wherein said control frame moving means comprises another annular piston on the control frame sealably slidable within the space to form a variable capacity pressure chamber intermediate said other piston and the other closed end of the space, and a port through said valve body communicating with said last-mentioned pressure chamber.

13. A valve of the character defined in claim 12, wherein said means for urging said tubular means into seated engagement with said valve member comprises annular pistons on said tubular means.

14. A valve of the character defined in claim 12, including a control line connecting with each of said ports, and valve means in said control line for admitting pressure fluid to one of said chambers while exhausting pressure fluid from the other of said chambers.

15. A valve, comprising a valve body connectable in a flow line, tubular means having a passageway therethrough and arranged concentrically within the valve body to provide an annular space therebetween, said tubular means including a tubular member sealably slidable within the valve body to close one end of the space and having a seat thereacross, a valve member having an opening therethrough and seatable on the seat for opening and closing the passageway upon rotation about an axis disposed transversely to the opening therethrough, means for urging said tubular member into seated engagement with the valve member, a control frame movable in a path longitudinally within the valve body concentrically outwardly of the passageway, an annular piston on the control frame sealably slidable within said space to form a variable capacity pressure chamber intermediate said piston and closed end of the space, a port through the valve body communicating with the pressure chamber, means for urging said control frame in a direction opposite to that toward which it is urged by pressure fluid within said chamber, and means connecting said valve member to said valve body and said control frame and responsive to movement of the control frame in opposite longitudinal directions for concurrently rotating and moving said valve member longitudinally of the valve body between opened and closed positions.

16. A valve of the character defined in claim 9, wherein said tubular means also includes another tubular member sealably slidable within the valve body in substantial axial alignment with the first-mentioned tubular member to close the other end of said spaced and having a seat thereacross for seating upon the opposite side of said valve member, and means for urging said other tubular member into seated engagement with said valve member, said control frame being disposed within said annular space.

17. A valve of the character defined in claim 16, wherein the means for urging said first-mentioned tubular member into seating engagement with the valve member includes an annular piston thereon within said pressure chamber.

18. A valve of the character defined in claim 17, wherein the annular piston on said first-mentioned tubular member has a smaller effective pressure responsive area than that of the annular piston on the control frame.

19. A valve, comprising a valve body connectable in a flow line, a tubular member having a passageway therethrough and sealably slidable longitudinally within and concentrically of the valve body to provide an annular space therebetween which is closed at one end, a seat across said tubular member, a valve member having an opening therethrough and seatable on the seat for opening and closing the passageway upon rotation about an axis disposed transversely to the opening therethrough, a control frame movable in a path longitudinally within the valve body concentrically outwardly of the passageway, an annular piston on the control frame sealably slidable within said space to form a variable capacity pressure chamber intermediate said piston and closed end of the space, a port through the valve body communicating with the pressure chamber, means for urging said control frame in a direction opposite to that toward which it is urged by pressure fluid within said chamber, means connecting said valve member to said valve body and said control frame and responsive to movement of the control frame in opposite longitudinal directions for concurrently rotating and moving said valve member longitudinally of the valve body between opened and closed positions, and a pressure responsive surface on said tubular member within said pressure chamber and arranged to urge said member into seating engagement with said valve member.

20. A valve of the character defined in claim 19, wherein said annular piston on the control frame has a greater area than that of the pressure responsive surface on the tubular member.

21. A valve, comprising a valve body having a passageway therethrough, a pair of spaced apart and oppositely facing valve seats in surrounding relation to an intermediate portion of said passageway, a valve member having an opening therethrough and seatable on the valve seats for opening and closing the passageway upon rotation about an axis disposed transversely to the opening therethrough, cam slots on opposite sides of the valve member, means enclosing a space within the valve body outwardly of the passageway therethrough, a pair of relatively movable and telescopically arranged parts each having pistons thereon slidable within said space to provide a variable capacity pressure chamber therebetween, cam lugs on each of said parts operatively engaged with the cam slots in said valve member, and means for moving said pistons toward and away from one another to rotate the valve member between opened and closed positions, said moving means comprising a port through the valve body communicating with said chamber, and means for urging said pistons in directions opposite those toward which they are urged by fluid within said chamber.

22. A valve of the character defined in claim 21, wherein said valve seats are formed on tubular members arranged concentrically within the valve body to define the passageway therethrough and the space annularly thereabout, and said parts and pistons thereon are movable within said space longitudinally of the valve body.

23. A valve of the character defined in claim 22, wherein said urging means comprises pressure responsive surfaces on the pistons opposite to such surfaces thereon within the chamber and in fluid communication with said passageway.

24. A valve of the character defined in claim 21, wherein said space extends laterally from said passageway adjacent said seats, and said parts and pistons thereon are movable within said space laterally of the valve body.

25. A valve of the character defined in claim 24, wherein said urging means comprises pressure responsive surfaces on the pistons opposite to such surfaces thereon within the chamber in fluid communication with said passageway.

26. A valve of the character defined in claim 25, wherein the end of said space remote from the passageway is closed to provide another variable capacity pressure chamber intermediate said closed end and the last-mentioned pressure responsive surface on one of said pistons, and a passageway is provided through said one piston for communicating said passageway and said last-mentioned pressure responsive surface.

27. A valve, comprising a valve body including an intermediate sleeve portion and parts at each end of the sleeve for connection in a flow line, tubular means having a passageway therethrough and arranged concentrically within said sleeve portion to provide an annular space therebetween, which is closed at one end, seat means across said tubular means, a valve member having an opening therethrough and seatable on the seat means for opening and closing the passageway upon rotation about an axis disposed transversely to the opening therethrough, a control frame movable in a path longitudinally within said sleeve portion concentrically outwardly of the passageway therethrough, means connecting said valve member to said control frame for rotation between opened and closed positions upon movement of the frame in opposite longitudinal directions, means for urging said control frame in said opposite longitudinal directions, said means including a spring arranged within said space and bearing upon said control frame to exert a force thereon effective to urge said frame in one direction relative to one end part of the valve body, and a releasable connection between said sleeve portion and the one end part to permit movement of said sleeve portion in the opposite direction relative to said one end part.

28. A valve of the character defined in claim 27, wherein said releasable connection comprises a shear pin.

References Cited in the file of this patent

UNITED STATES PATENTS

| | | |
|---|---|---|
| 1,759,060 | Moore | May 20, 1930 |
| 2,645,448 | Bugg | July 14, 1953 |
| 2,708,563 | Backman | May 17, 1955 |
| 2,785,755 | En Dean | Mar. 19, 1957 |
| 2,908,330 | Fredd | Oct. 13, 1959 |
| 2,963,089 | Sizer | Dec. 6, 1960 |